United States Patent [19]
Otake

[11] Patent Number: 4,710,119
[45] Date of Patent: Dec. 1, 1987

[54] INJECTION MOLDING MACHINE USING SERVO MOTOR AND HAVING MOLD PROTECTING FUNCTION

[75] Inventor: Hiromasa Otake, Tanashi, Japan
[73] Assignee: Fanuc Ltd., Minamitsuru, Japan
[21] Appl. No.: 885,610
[22] PCT Filed: Nov. 8, 1985
[86] PCT No.: PCT/JP85/00624
   § 371 Date: Jul. 8, 1986
   § 102(e) Date: Jul. 8, 1986
[87] PCT Pub. No.: WO86/02878
   PCT Pub. Date: May 22, 1986

[30] Foreign Application Priority Data
Nov. 9, 1984 [JP] Japan .................. 59-235258
[51] Int. Cl.⁴ .................................. B29C 45/84
[52] U.S. Cl. ........................... 425/136; 425/137; 425/138; 425/150; 425/589
[58] Field of Search .................. 425/136-138, 425/150, 589; 264/40.5

[56] References Cited
U.S. PATENT DOCUMENTS

| | | | |
|---|---|---|---|
| 2,372,833 | 4/1945 | Jobst | 425/137 |
| 2,391,362 | 12/1945 | Strauss | 425/137 |
| 2,801,442 | 8/1957 | Moslo | 425/137 |
| 2,923,973 | 2/1960 | Ninneman | 425/137 |
| 3,452,399 | 7/1969 | Blumer | 425/137 X |
| 3,525,382 | 8/1970 | Devol | 425/137 X |
| 3,642,401 | 2/1972 | Wilson | 425/137 |
| 3,736,087 | 5/1973 | Ruegg | 425/137 |
| 3,942,928 | 3/1976 | Kelz | 425/138 |
| 4,473,345 | 9/1984 | McDowall | 425/137 |

FOREIGN PATENT DOCUMENTS
54-18299 7/1979 Japan .

*Primary Examiner*—Richard L. Chiesa
*Attorney, Agent, or Firm*—Staas & Halsey

[57] ABSTRACT

An injection molding machine uses a servo motor (M) as a drive source of a mold clamp mechanism (2) and includes a mold protecting function. An NC control unit (4) for driving the servo motor (M) has a torque limit function, and performs torque limit when a mold is discriminated to have reached a preset mold protection start position, based on a detection output from a position detector (P). The NC control unit (4) further has a display unit (10). When a predetermined period of time elapses before the mold reaches a preset mold contact position, beginning from a point in time at which the mold reaches the preset mold protection start position, an alarm display is generated by the display unit (10).

3 Claims, 2 Drawing Figures

# INJECTION MOLDING MACHINE USING SERVO MOTOR AND HAVING MOLD PROTECTING FUNCTION

BACKGROUND OF THE INVENTION

The present invention relates to an injection molding machine and, more particularly, to an injection molding machine which uses a servo motor as a drive source for driving its clamp mechanism and in which a mold is prevented from being damaged.

Conventional injection molding machines use hydraulic pressure as a drive source for a clamp mechanism thereof. If foreign matter is present in the mold and the mold is clamped without removing the foreign matter, it may damage the mold. In order to prevent this, so-called mold protection has been conventionally performed, wherein the clamp mechanism is driven at a minimum hydraulic level, and when the mold is abutted against foreign matter upon this movement, it is prohibited from moving further, thereby protecting the mold.

SUMMARY OF THE INVENTION

It is the object of the present invention to allow the above mold protection even if the clamp mechanism of an injection molding machine is driven by a servo motor.

In order to achieve the above object, the injection molding machine of the present invention uses a servo motor as a drive source for driving a mold clamp mechanism which operates a mold, and comprises a position detector for detecting the position of the mold, and an NC control unit for controlling the servo motor. The NC control unit has a torque limit function for setting the torque output from the servo motor below a predetermined value, and comprises a mold position discriminating means for discriminating whether a mold protection start position and a mold contact position in the mold have reached corresponding preset values based on a detection output from the position detector; an elapsed time discriminating means for discriminating whether a preset predetermined time period after a point in time at which the mold reaches the preset mold position, has elapsed; and an alarm means for generating an alarm when the predetermined period of time has elapsed before the mold reaches the preset contact position. During the mold clamping operation, when the mold reaches the mold protection start position, the NC control unit outputs a torque limit instruction to close the mold with a small drive force corresponding to the preset limit torque output. If the mold does not reach the mold contact position within the predetermined period of time, an alarm is produced to protect the mold.

As described above, according to the present invention, mold protection can be performed easily by the torque limit function of the NC control unit, and the torque limit value can be set arbitrarily, thereby allowing easy control.

DESCRIPTION OF THE PREFERRED EMBODIMENTS

Figure 1:
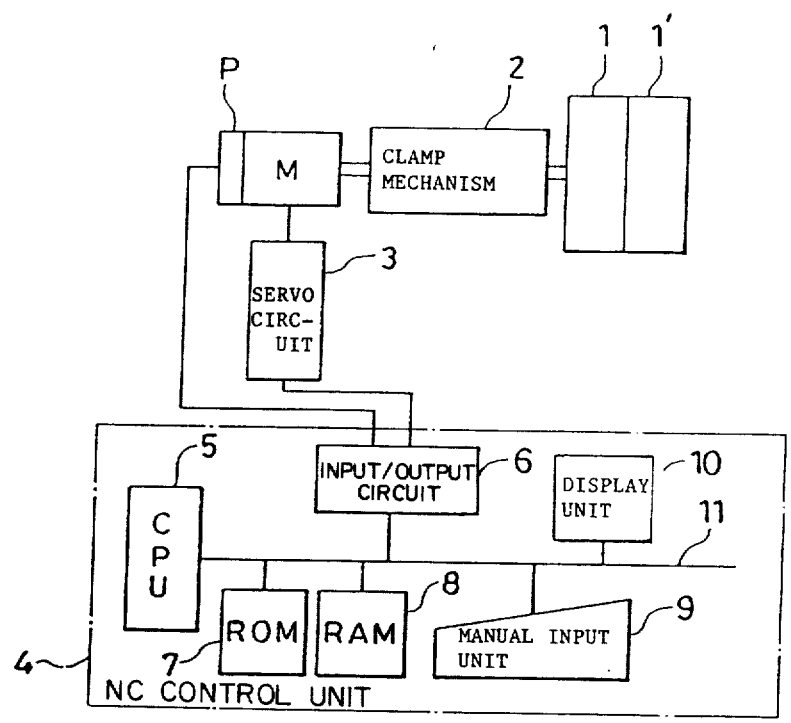
FIG. 1 is a block diagram of a main part of an injection molding machine having a mold protecting function according to an embodiment of the present invention.

FIG. 1 is a block diagram of a main part of an injection molding machine according to an embodiment of the present invention. In FIG. 1, reference numerals 1 and 1' denote mold members; 2, a clamp mechanism for opening/closing the mold members 1 and 1'; M, a servo motor for driving the mold clamp mechanism 2; P, a position detector provided in the servo motor M for detecting the operating position of the movable mold member 1; 3, a servo circuit for controlling the servo motor M; 4, an NC control unit; 5, a central processing unit (to be referred to as a CPU hereinafter); and 6, an input/output circuit connected to the servo circuit 3, the CPU 5, and the position detector P.

A ROM 7 stores a control program for controlling the injection molding machine. A RAM 8 temporarily stores data and processes operations. A manual input unit 9 is used for setting the operating positions of the mold member 1 (at which various instructions and a torque limit instruction ofr mold protection (to be described later) are supplied), a torque limit value corresponding to the torque limit instruction, a predetermined timer time to be described later, etc. A display unit 10 displays an alarm. Reference numeral 11 denotes buses.

Figure 2:
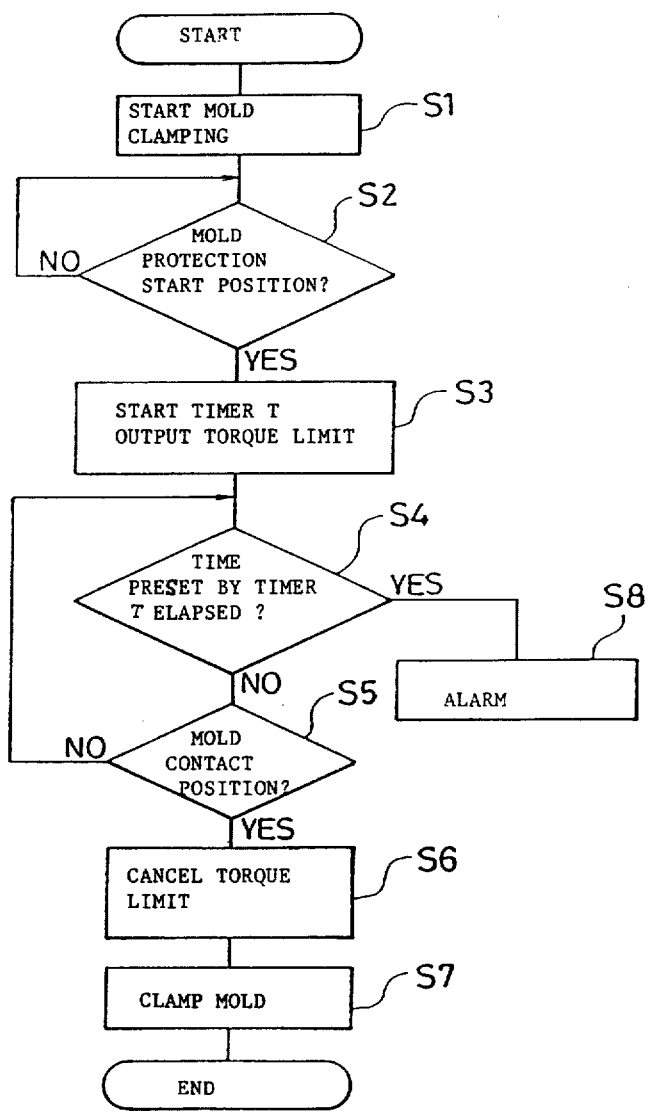
FIG. 2 is a flow chart of a program for executing the mold protection using the injection molding machine of FIG. 1.

Mold protection according to this embodiment will be described with reference to FIG. 2.

Prior to the operation of the injection molding machine, a mold protection start position (i.e., the operating position of the mold member 1 at which a torque limit instruction is to be supplied from the NC control unit 4) a torque limit value corresponding to the torque limit instruction, a timer time, and the like are set by the manual input unit 9, and are stored in the RAM 8. The torque limit instruction limits the output torque of the servo motor M so that the servo motor M does not have a torque exceeding a predetermined value. The torque limit instruction is sent from the NC control unit 4 having a torque limit function.

After the start of the injection molding machine, the injection molding cycle proceeds. When the servo motor M drives the mold clamp mechanism 2 to start the mold clamping operation (step S1), the CPU 5 checks to determine if the mold member 1 has reached the mold protection start set position from the detection output signal based one the position detector P, which represents the position of the movable mold 1 (step S2). If it is determined that the set position is reached, a timer T (comprising a software timer) is started, and the preset value of the torque limit instruction is read out from the RAM 8 and is supplied to the servo circuit 3 through the input/output circuit 6 (step S3). As a result, the servo motor M is driven at a torque lower than the preset limit torque, and the mold member 1 is moved forward by a weak drive force, corresponding to the low torque, in a direction to close the mold. The CPU 5 checks if the timer time or the time preset by the timer T has elapsed (step S4). Since the timer time of the timer T is set in advance at a value which is sufficient for allowing the movable mold 1 to move from the preset mold start position to a preset mold contact position stored in the RAM 8, the answer of the step S4 is normally negative when no foreign matter exists between the mold members 1, 1'. Then, the output from the positon detector P is compared with the preset mold contact position to determine if the mold member 1 has moved to the mold contact position to contact the stationary mold member 1' (step S5). If it is determined that the mold contact position of the mold member 1 is reached, the torque limit is cancelled (step S6) and the mold members 1 and 1' are clamped (step S7), thus terminating mold clamping.

If it is determined in steps S4 and S5 that the time preset by the timer T has elapsed before the mold member 1 reaches the mold contact position, the CPU 5 generates an alarm through the display unit 10 in order to warn of the presence of foreign matter between the mold members 1 and 1'. More specifically, after the mold member 1 reaches the mold protection start position, the mold member 1 is driven by a drive force smaller than that corresponding to the torque limit instruction value. Therefore, if the mold members 1 and 1' are abutted against the foreign matter interposed therebetween, the mold member 1 can no longer move forward and is stopped in that position. As a result, the time preset by the timer T elapses before the mold member 1 reaches the mold contact position, and the display unit 10 generates an alarm as described above. Note that when the forward movement of the mold member 1 is prohibited, the mold 1 does not reach a movement instructed position instructed by the NC control unit 4. Therefore, an error between a feedback signal from the position detector P and the movement instructed value is increased. When the error exceeds a predetermined allowable value, the NC control unit 4 stops the servo motor M, thereby stopping the mold member 1.

What is claimed is:

1. A mold injecting machine using a servo motor and having a mold protecting function, comprising:

a clamp mechanism for operating a mold to perform mold clamping;

a servo motor, coupled to said clamp mechanism, for driving said clamp mechanism;

a position detector, coupled to said servo motor, for detecting a positon of the mold and producing a detection output; and an NC control unit, coupled to said servo motor and said position detector, for controlling said servo motor, said NC control unit having a torque limit function for suppressing a torque output from said servo motor below a predetermined value, said NC control unit including:

means for inputting a preset mold protection start position, a preset mold contact position and a preset predetermined time period, the preset predetermined time period being set to a value sufficient for allowing the mold to move from the preset mold protection start position to the preset mold contact position when no foreign matter exists in the mold;

mold position discriminating means for discriminating whether the preset mold protection start position and the preset mold contact position have been reached based on the detection output from said position detector;

elapsed time discrminating means for discriminating whether the preset predetermined time period has elapsed after a point in time at which the mold reaches the preset mold protection start position; and alarm means for generating an alarm when the predetermined period of time has elapsed before the mold reaches the preset mold contact position.

2. A mold injecting machine according to claim 1, wherein said alarm means comprises a display unit.

3. A mold injecting machine according to claim 1, wherein said inputting means comprises amanual input unit.

* * * * *

UNITED STATES PATENT AND TRADEMARK OFFICE
CERTIFICATE OF CORRECTION

PATENT NO. : 4,710,119
DATED : December 1, 1987
INVENTOR(S) : Hiromasa OTAKE

It is certified that error appears in the above-identified patent and that said Letters Patent is hereby corrected as shown below:

Column 2, line 50, change "from" to --based on--;
          line 51, change "based" to --from--;
          line 51, delete "one".

Column 4, line 37, change "amanual" to --a manual--.

Signed and Sealed this

Seventh Day of June, 1988

Attest:

DONALD J. QUIGG

Attesting Officer

Commissioner of Patents and Trademarks